(12) United States Patent
Anderson et al.

(10) Patent No.: US 10,887,274 B2
(45) Date of Patent: *Jan. 5, 2021

(54) TEXT MESSAGE INTEGRATION WITH A COMPUTER-IMPLEMENTED COLLABORATION PLATFORM

(71) Applicant: Filevine, Inc., Provo, UT (US)

(72) Inventors: Ryan M. Anderson, Las Vegas, NV (US); Nathan Morris, Las Vegas, NV (US); James Blake, Las Vegas, NV (US)

(73) Assignee: FILEVINE, INC., Provo, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/821,461

(22) Filed: Mar. 17, 2020

(65) Prior Publication Data

US 2020/0220836 A1 Jul. 9, 2020

Related U.S. Application Data

(63) Continuation of application No. 16/182,416, filed on Nov. 6, 2018, now Pat. No. 10,608,979, which is a continuation of application No. 14/923,056, filed on Oct. 26, 2015, now Pat. No. 10,129,200.

(60) Provisional application No. 62/084,404, filed on Nov. 25, 2014, provisional application No. 62/214,426, filed on Sep. 4, 2015.

(51) Int. Cl.
*H04L 29/08* (2006.01)
*H04L 12/58* (2006.01)
*H04W 4/14* (2009.01)

(52) U.S. Cl.
CPC ............ *H04L 51/36* (2013.01); *H04L 51/046* (2013.01); *H04W 4/14* (2013.01)

(58) Field of Classification Search
CPC ......... H04L 51/36; H04L 51/046; H04W 4/14
See application file for complete search history.

(56) References Cited

U.S. PATENT DOCUMENTS

| 7,245,929 B2 | 7/2007 | Henderson et al. |
| 7,277,717 B1 | 10/2007 | Hart et al. |
| 8,121,625 B2 | 2/2012 | Carroll |

(Continued)

FOREIGN PATENT DOCUMENTS

GB 2433615 6/2007

OTHER PUBLICATIONS

U.S. Appl. No. 62/084,404, filed Nov. 25, 2014, Anderson et al.

(Continued)

*Primary Examiner* — Adnan M Mirza
(74) *Attorney, Agent, or Firm* — Workman Nydegger

(57) ABSTRACT

The present disclosure describes integrating SMS/MMS messaging with a collaboration platform, and filtering SMS/MMS messages within a collaboration platform. One embodiment includes associating a phone number with a project within a collaboration platform; receiving an SMS/MMS message at the phone number from a mobile telephone device; and based on receiving the SMS/MMS message at the phone number, adding the content of the message to an activity feed of the project. In another embodiment, a phone number can be associated with a plurality of projects. Attributes of SMS/MMS messages received at this phone number are compared to project data of the plurality of projects to route the message content to an activity feed of a project of the plurality of projects, or to a mailroom.

20 Claims, 21 Drawing Sheets

(56) References Cited

U.S. PATENT DOCUMENTS

| | | |
|---|---|---|
| 8,200,258 B2 | 6/2012 | Yahav et al. |
| 10,129,200 B2 | 11/2018 | Anderson et al. |
| 10,608,979 B2 | 3/2020 | Anderson et al. |
| 2008/0114841 A1 | 5/2008 | Lambert |
| 2008/0209417 A1 | 8/2008 | Jakobson |
| 2008/0255919 A1 | 10/2008 | Gorder |
| 2009/0030765 A1 | 1/2009 | Cameron et al. |
| 2009/0216678 A1 | 8/2009 | May |
| 2011/0071893 A1 | 3/2011 | Malhotra et al. |
| 2014/0215472 A1 | 7/2014 | Motahari Nezhad et al. |
| 2015/0363733 A1 | 12/2015 | Brown |

OTHER PUBLICATIONS

U.S. Appl. No. 62/214,426, filed Sep. 4, 2015, Anderson et al.
U.S. Appl. No. 14/923,056, filed Oct. 26, 2015, Anderson et al.
U.S. Appl. No. 16/182,416, filed Nov. 6, 2018, Anderson et al.
Collaborate on SMS with Front [Published Jul. 29, 2014] https://www.youtube.com/watch?reload=9&v=clX4URhd8Fg.
U.S. Appl. No. 14/923,056, Jul. 25, 2017, Office Action.
U.S. Appl. No. 14/923,056, Mar. 5, 2018, Final Office Action.
U.S. Appl. No. 14/923,056, Aug. 15, 2018, Notice of Allowance.
U.S. Appl. No. 16/182,416, Jan. 10, 2020, Notice of Allowance.

Add/Edit Person  ✕

+ Invite

Name: Paul
Project

Date of Birth: 01 01 2001
Social Security Number: 000000000

Cancel  Save

601

Addresses
123 East Example Ave.
City, State, USA
+ Add

Phones
cell 123-433-1234
hm 987-987-9999
+ Add

Emails
+ Add

*FIG. 17*

TEXT MESSAGE INTEGRATION WITH A COMPUTER-IMPLEMENTED COLLABORATION PLATFORM

CROSS-REFERENCE TO RELATED APPLICATIONS

This application is a continuation of U.S. patent application Ser. No. 16/182,416, filed Nov. 6, 2018 and titled "TEXT MESSAGE INTEGRATION WITH A COMPUTER-IMPLEMENTED COLLABORATION PLATFORM," which issues as U.S. Pat. No. 10,608,979 on Mar. 31, 2020, which is a continuation of U.S. patent application Ser. No. 14/923,056, filed on Oct. 26, 2015 and titled "TEXT MESSAGE INTEGRATION WITH A COMPUTER-IMPLEMENTED COLLABORATION PLATFORM," which issued as U.S. Pat. No. 10,129,200 on Nov. 13, 2018, which is a non-provisional application claiming priority to and the benefit of U.S. Patent Application Ser. No. 62/084,404, filed on Nov. 25, 2014 and titled "SMS/MMS INTEGRATION WITH PROJECT MANAGEMENT," and U.S. Patent Application Ser. No. 62/214,426, filed on Sep. 4, 2015 and titled "TEXT MESSAGE FILTERING FOR PROJECT MANAGEMENT," the entirety of each application is expressly incorporated herein by this reference.

BACKGROUND

Many industries utilize collaboration platforms to simplify the coordination of communications and individual projects. For example, for a given project, a collaboration platform may provide multiple users the ability to upload/create, modify, delete, and view various data items associated with the projects, such as documents, contacts, tasks, communications, billing, etc.

A particular challenge to project-based collaboration is tracking project-related communications. For example, project members may communicate using internal project management software mechanisms, as well as external mechanisms (e.g., e-mail, SMS/MMS messaging, telephone calls, voice over IP (VoIP) calls, Internet messaging, etc.). With use of such disparate communications mechanisms, it can be difficult for project members to readily assemble their own communications related to a particular project, let alone communications among other project members.

In addition, an influx of communications can create challenges related to the handling and coordination of the communications. Communications may be lost, misdirected, or simply buried amidst the inflow of communications. Where the ability to receive and respond to such communications is reduced, collaboration efficiencies and capabilities are likewise reduced.

BRIEF SUMMARY

At least some embodiments described herein advance the technical field of collaborative communications by providing systems, methods, and computer program products for integrating SMS/MMS messaging with one or more projects in a computer-implemented collaboration platform. In particular, embodiments herein include obtaining and associating a telephone number (that is capable of sending and receiving SMS/MMS messages) with a particular project in a computer-implemented collaboration platform. Embodiments herein also include one or more technical mechanisms for centralizing SMS/MMS communications related to the particular project, by integrating SMS/MMS communications sent or received by the telephone number with a collaborative communications portion of the particular project, such as an activity feed. Embodiments herein also include one or more technical mechanisms for sorting and routing SMS/MMS messages received at a phone number associated with a plurality of projects to the project(s) to which it pertains.

Certain embodiments are directed to a computer system, including: one or more processors; and one or more computer readable media having stored thereon instructions that are executable by the one or more processors to configure the computer system to integrate text messaging in a computer-implemented collaboration platform, including instructions that are executable to configure the computer system to at least: associate a phone number with a particular project within a collaboration platform to form a project phone number; receive a message at the project phone number; and based on receiving the message at the project phone number, add content of the message to an activity feed of the particular project.

Certain embodiments are directed to a computer system, including: one or more processors; and one or more computer readable media having stored thereon instructions that are executable by the one or more processors to configure the computer system to integrate text messaging in a computer-implemented collaboration platform, including instructions that are executable to configure the computer system to at least: associate a phone number with a particular project within a collaboration platform to form a project phone number; receive message content at an activity feed of the particular project; and based on receiving message content at the activity feed of the particular project, (i) add a posting in the activity feed, and (ii) send the message content to one or more phone numbers.

Certain embodiments are directed to a computer system, including: one or more processors; and one or more computer readable media having stored thereon instructions that are executable by the one or more processors to configure the computer system to integrate text messaging in a computer-implemented collaboration platform, including instructions that are executable to configure the computer system to at least: associate a phone number with a plurality of projects within a collaboration platform to form a project plurality phone number; receive a message at the project plurality phone number; compare the phone number from which the message was received to project data associated with the plurality of projects; and based on comparing the phone number from which the message was received to the project data, route the message to an activity feed of a project of the plurality of projects or route the message to a mailroom as a message currently unassociated with a project of the plurality of projects.

Certain embodiments address technical challenges particular to facilitating electronic communications within a collaborative environment. For example, technical challenges arising with electronic communications in a collaborative environment include how to present communications so that interested parties are provided with all relevant communications, can be presented with information updates quickly (e.g., in real time), and can be enabled to respond to communications quickly and efficiently. Application of at least some of the embodiments described herein can provide technical solutions that address such electronic communications and collaboration platform-centric challenges. For example, by associating project-based communications with a project phone number, by filtering messages received at the project phone number into a project-centralized activity feed, and/or by providing for the sending of messages from the project phone number using a project-centralized activity feed, project-related electronic communications related to one or more projects can be received, categorized, filtered, and/or sent from a number of locations, from a number of different users, and through multiple modes of communication (e.g., through an activity feed associated with a project and/or through SMS/MMS messaging). This can beneficially enhance the efficiency of communications and can improve overall collaborative efficiency of project(s), which, in some embodiments, can include time-sensitive and/or delivery-sensitive (e.g., needs to be delivered to a particular group of interested parties) information.

BRIEF DESCRIPTION OF THE DRAWINGS

To further clarify the above and other advantages and features of the present disclosure, a more particular description of the invention will be rendered by reference to specific embodiments thereof which are illustrated in the appended drawings. It is appreciated that these drawings depict only illustrated embodiments of the invention and are therefore not to be considered limiting of its scope. Embodiments of the invention will be described and explained with additional specificity and detail through the use of the accompanying drawings in which:

FIG. 9 illustrates the user interface of FIG. 7 showing a reply entered using the SMS/MMS application of FIG. 8;

Figure 12:
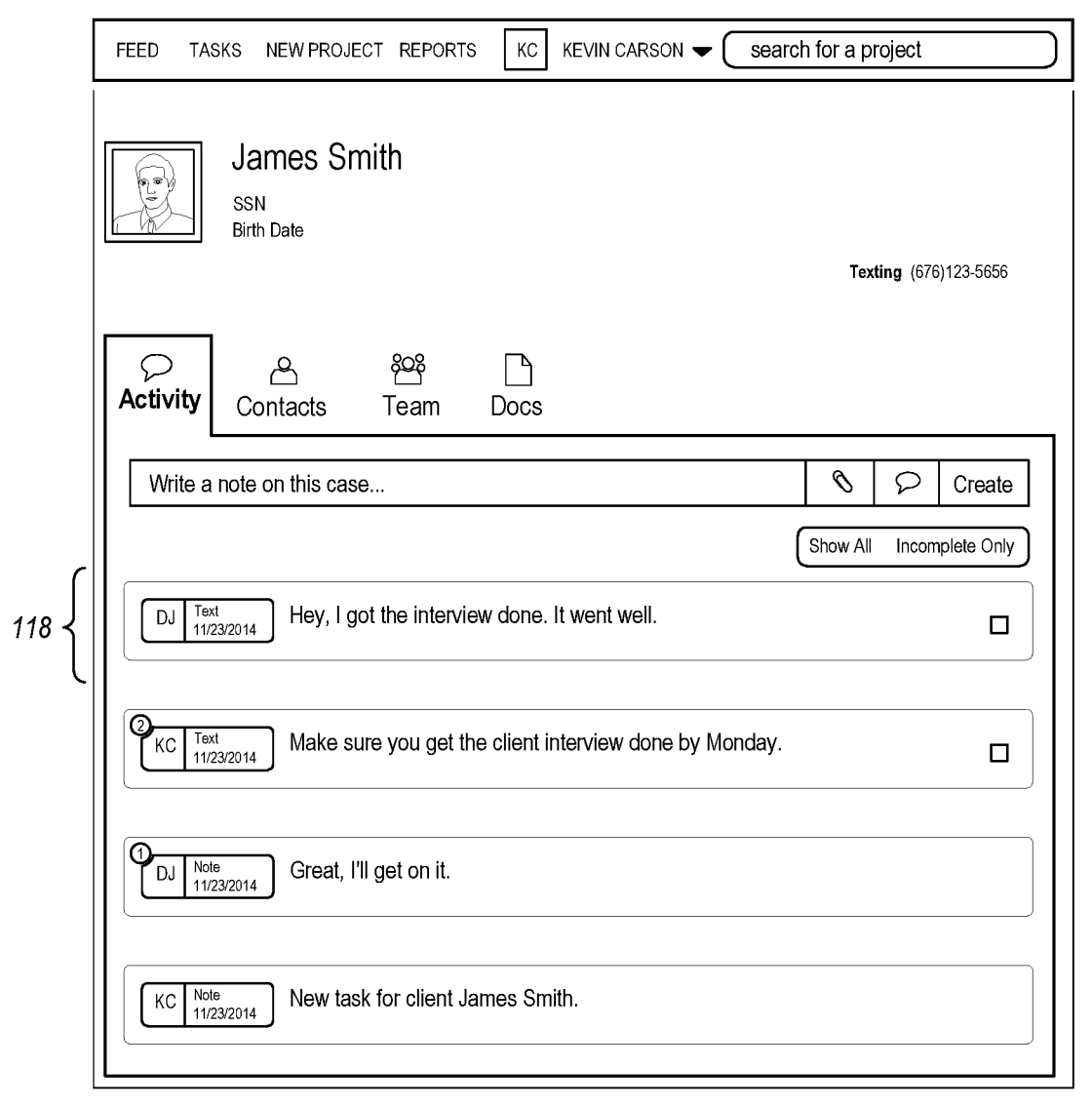

FIG. 12 illustrates the user interface of FIG. 10 showing that a reply entered using the SMS/MMS application of FIG. 11 is displayed at the user interface;

FIG. 17 illustrates a user interface for entering identifiers or other project data to associate with a project;

DETAILED DESCRIPTION

At least some embodiments described herein advance centralized and collaborative project-related communications by integrating SMS/MMS messaging with a project in a computer-implemented collaboration platform. In particular, embodiments herein include obtaining and associating a telephone number (that is capable of sending and receiving SMS/MMS messages) with a particular project in a computer-implemented collaboration platform. Embodiments herein also include one or more technical mechanisms for centralizing SMS/MMS communications related to the particular project, by integrating SMS/MMS communications sent or received by the telephone number with a centralized and collaborative communications portion of the particular project, such as an activity feed.

Embodiments may include a project coordinator creating an SMS/MMS-based thread in an activity feed based on an SMS/MMS message that is received by an SMS/MMS control at a project's associated phone number. Embodiments also include an SMS/MMS control initiating an SMS/MMS message to a phone number, sent from the project's associated phone number, based on a reply made to the SMS/MMS-based thread in the activity feed.

Embodiments may also include a project coordinator creating an SMS/MMS-based thread in an activity feed based on a message that is created within the activity feed and addressed to one or more identified phone numbers, and that is sent by an SMS/MMS control as one or more SMS/MMS messages from the project's associated phone number to the identified phone number(s).

Embodiments may include a project coordinator creating an SMS/MMS-based thread in an activity feed of a project, the project being one of a plurality of projects associated with a telephone number. Embodiments also include an SMS/MMS control initiating an SMS/MMS message to a telephone number related to a project of the plurality of projects, sent from the telephone number associated with the plurality of projects.

Figure 21:
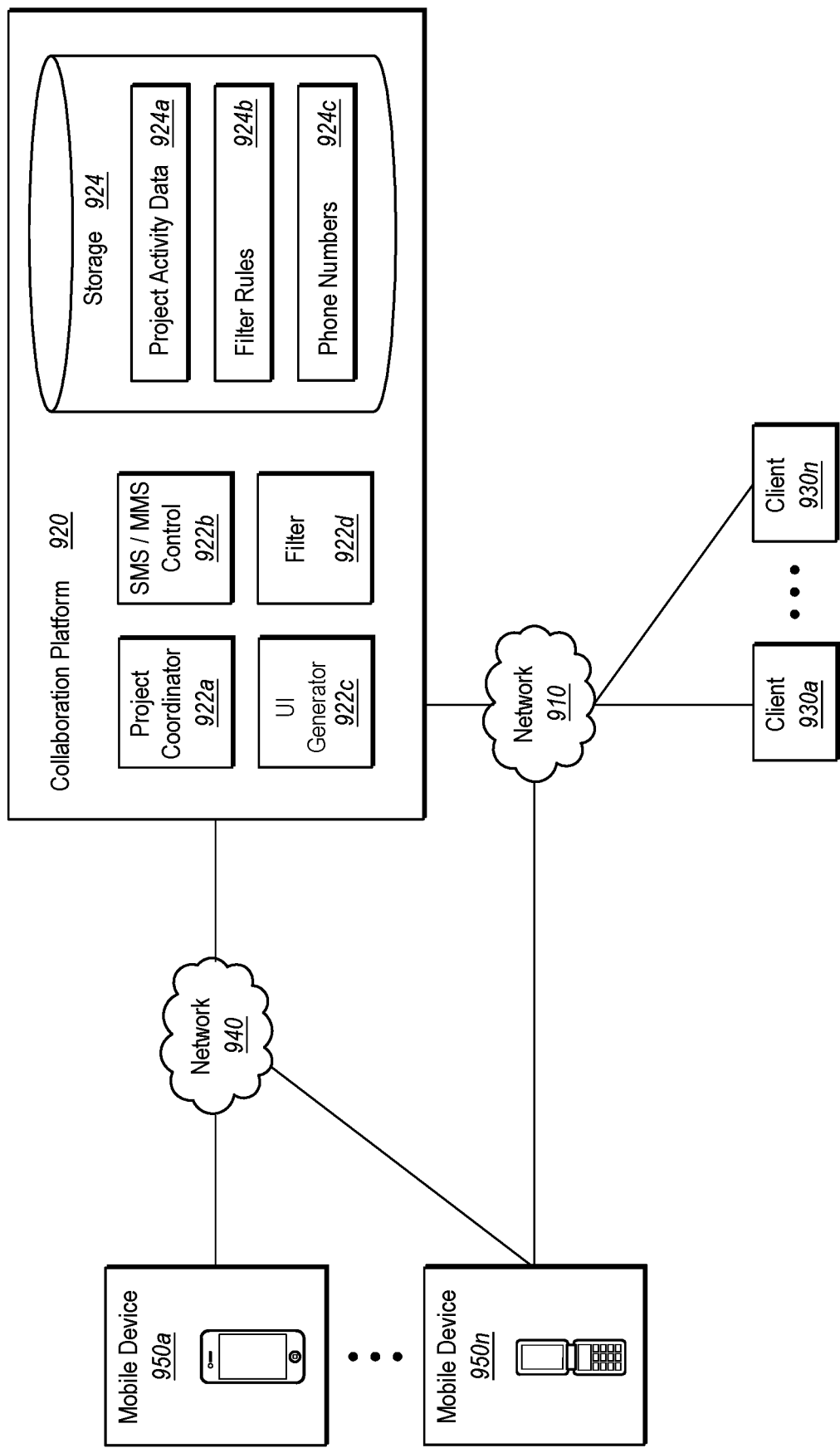
FIG. 21 illustrates a computing environment that can be used to integrate SMS/MMS messaging into a computer-implemented collaboration platform.

FIG. 21 illustrates an exemplary architecture in which SMS/MMS messaging is integrated into a computer-implemented collaboration platform. The illustrated embodiment includes a collaboration platform 920 in communication with one or more client computer devices 930*a* to 930*n*, and one or more mobile devices 950*a* to 950*n*. As indicated by the ellipses, architecture 900 can include any number of client computer devices 930*a* to 930*n* and any number of mobile devices 950*a* to 950*n* (referred to hereinafter as 930 and 950, respectively).

The collaboration platform 920, the one or more client computer devices 930, and the one or more mobile devices 950 are connected by (or are part of) a network 910, such as, for example, a Local Area Network ("LAN"), a Wide Area Network ("WAN"), and even the Internet. In addition, the collaboration platform 920, the one or more client computer devices 930, and the one or more mobile devices 950 can be connected by (or can be part of) network 940, which may be configured similar to network 910. In some embodiments, network 940 is a public switched telephone network (PSTN).

The illustrated collaboration platform 920 includes storage 924. The storage 924 can be used for storing project activity data 924a, filter rules 924b, and phone numbers 924c (and/or other identity information), for example. The illustrated collaboration platform 920 includes a user interface generator 922c configured to generate a user interface and send the user interface to one or more client computer devices 930 (e.g., through network 910).

The illustrated collaboration platform 920 also includes a project coordinator 922a configured to associate a phone number with a particular project (e.g., by storing the association in phone numbers data 924c). In addition, the project coordinator 922a is configured to receive electronic communication input originating from the one or more client computer devices 930 and/or from the one or more mobile devices 950, to store the electronic communications as project activity data 924a, and to arrange the received electronic communication input into a centralized location (e.g., an activity feed of the particular project) for enabling centralized and efficient project-related collaboration.

The illustrated collaboration platform 920 also includes an SMS/MMS control 922b configured to send SMS/MMS messages from a phone number of the collaboration platform 920 that has been associated with a particular project (e.g., as stored in phone numbers data 924c) and/or to receive SMS/MMS messages at the phone number that has been associated with the particular project.

The illustrated collaboration platform 920 also includes a filter 922d configured to sort and route messages received at a phone number that has been associated with a plurality of different projects, in order to deliver the received communication to the appropriate project-related centralized collaboration location. For example, the filter 922d can compare data associated with an incoming communication (e.g., the phone number from which the message was received) with phone numbers 924c and/or other stored identifier data, and according to filter rules 924b, route the message to an appropriate project-related location.

FIGS. 1-12 illustrate examples of SMS/MMS integration with a project in a computer-implemented collaboration platform. One of ordinary skill in the art will appreciate, in view of the disclosure herein, that the embodiments of FIGS. 1-12 represent only example implementations of SMS/MMS integration with a project in a computer-implemented collaboration platform. As such, one of ordinary skill in the art will appreciate that associating a telephone number with a particular project in a computer-implemented collaboration platform, and integrating SMS/MMS messages sent or received by the telephone number into the particular project, may be implemented in a variety of manners.

Figure 1:
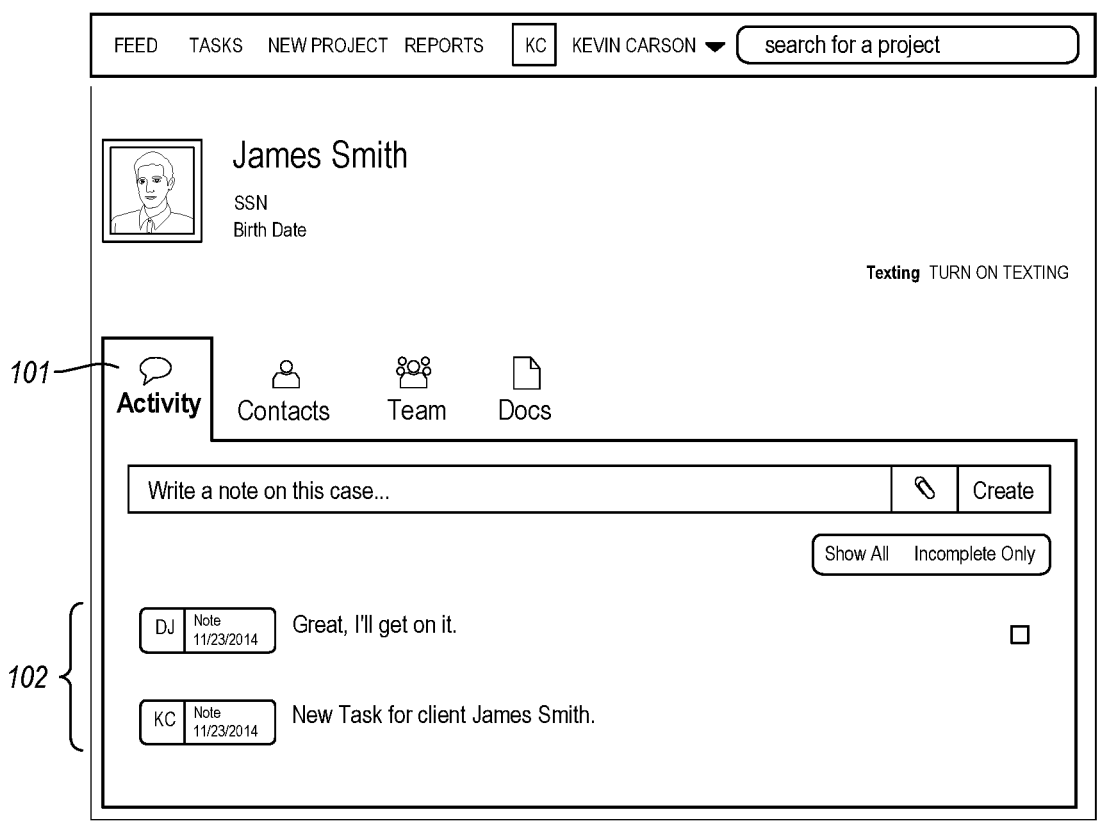
FIG. 1 illustrates an example user interface of a computer application including an activity feed for a project.
Figure 2:
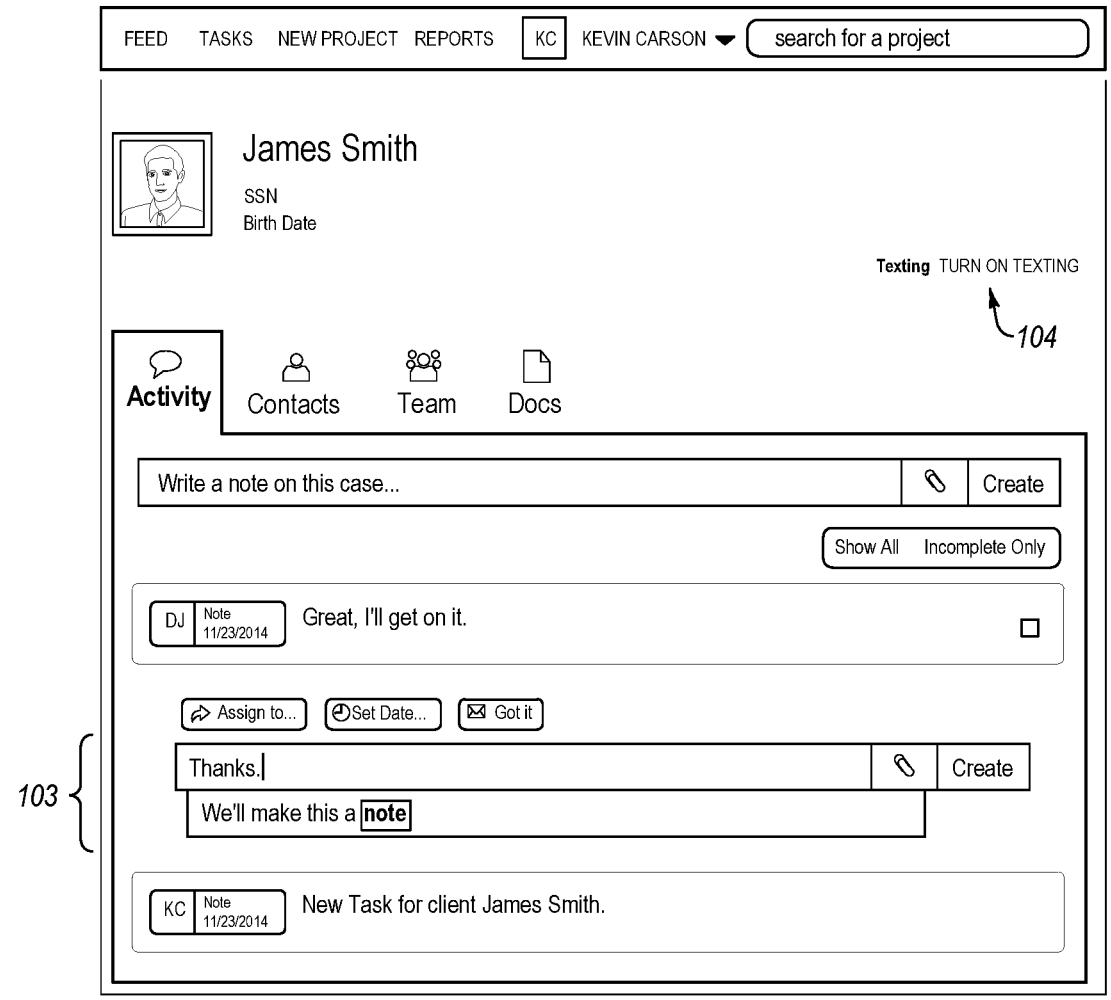
FIG. 2 illustrates the example user interface of FIG. 1, showing a user interface for replying to a post.

FIG. 1 illustrates an example user interface of a computer-implemented collaboration platform. In FIG. 1, the user interface presents a user (Kevin Carson, hereinafter KC) a particular project for a client (James Smith, hereinafter JS). As depicted, the user interface presents an activity feed 101 for the JS project. The activity feed 101 provides the ability for one or more users to post, view, and reply to messages (including attachments/documents) using internal collaboration platform messaging functionality. For example, the depicted postings 102 in the activity feed 101 include a first "Note" type post ("New task for client James Smith.") from KC, and a second "Note" type post ("Great, I'll get on it.") from an additional user (David Jones, hereinafter DJ). FIG. 2 further illustrates that the user interface includes elements that enable users to reply to or otherwise act on a post, thereby creating a thread including a plurality of related postings. For example, entry 103 is a reply ("Thanks.") by KC to DJ's post ("Great, I'll get on it.").

FIG. 2 also illustrates that the foregoing collaboration platform messaging functionality can be extended by integration of a phone number (and SMS/MMS messaging) with the project. In particular, FIG. 2 illustrates that the collaboration platform includes a user interface element 104 ("TURN ON TEXING") for enabling SMS/MMS integration with the JS project.

Figure 3:
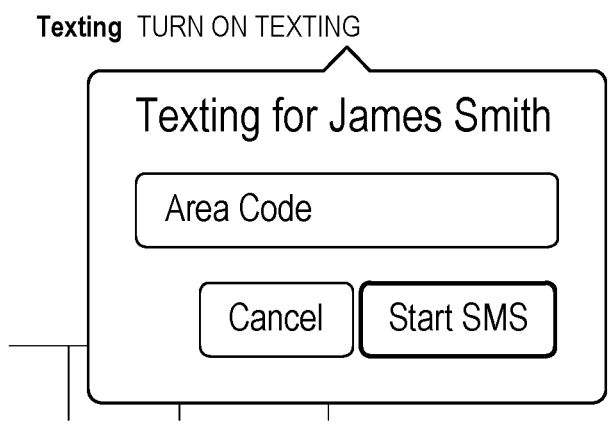
FIG. 3 illustrates an option in an example user interface for enabling the receipt of SMS/MMS integration with a project.

FIG. 3 illustrates that when the user interface element 104 is selected, the computer-implemented collaboration platform may provide an optional user interface dialogue to confirm whether texting should be enabled, to receive a desired area code for the phone number that is to be associated with the project, or to receive any additional information or confirmations related to assignment of a phone number to a project. For example, as a security consideration, it may be desirable to confirm whether texting should actually be enabled, since there may be a monetary cost associated with obtaining a phone number for the project and/or other security reasons for requiring confirmation. In addition, while the depicted example prompts the user for a desired area code for the project's phone number (e.g., when the project is a person or business), the area code may be determined in many other ways, such as by a configured preference setting (for the user, for the project, or for the collaboration platform generally), by detecting a geographic location of the user (e.g., based on an Internet Protocol address of the user, by querying a location API of the user's web browser, etc.), by making a random selection, etc.

Figure 4:
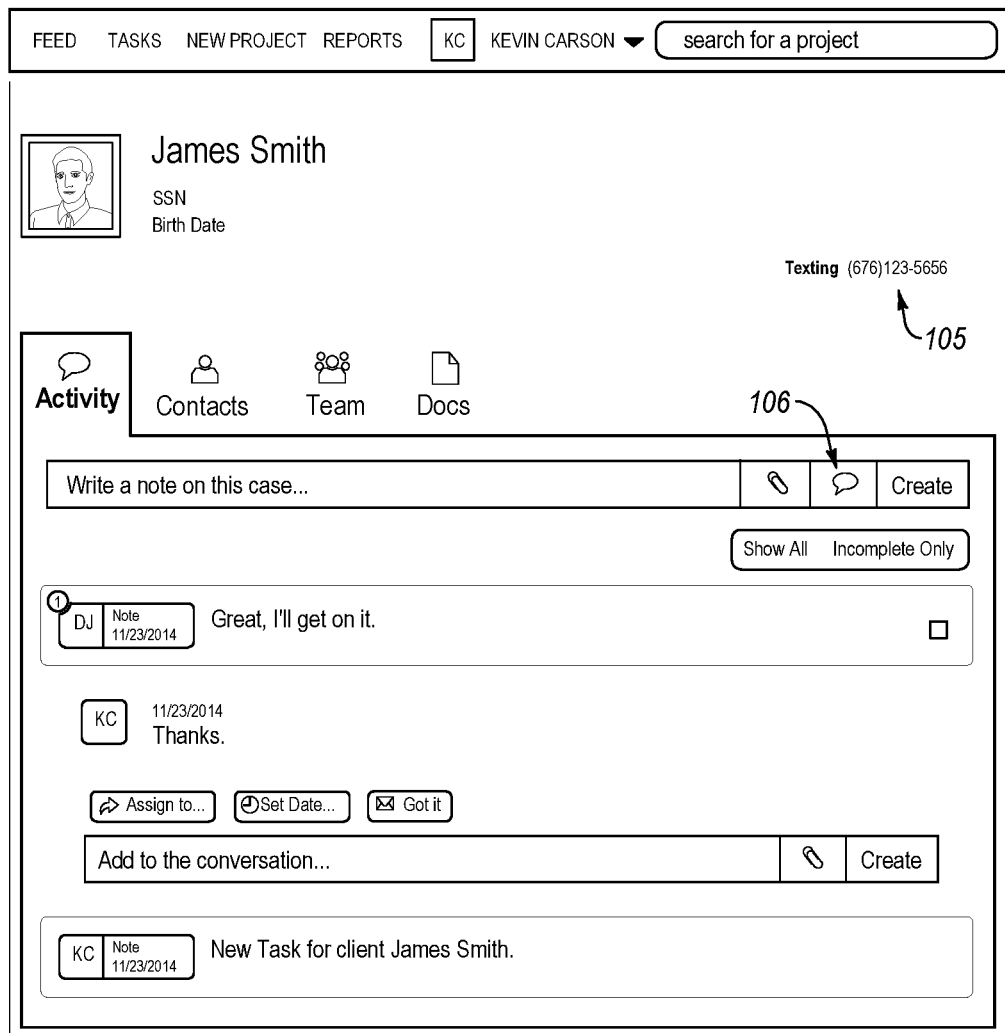
FIG. 4 illustrates an example user interface of a computer application with SMS/MMS integration enabled.

FIG. 4 illustrates the user interface of FIGS. 1 and 2, indicating that texting has been enabled. In particular, FIG. 4 illustrates that a phone number 105 (676-123-5656) has now been associated with the JS project, and that a new messaging user interface element 106 has been added, which is selectable to address a message to one or more phone numbers, when the message is created within the activity feed.

Figure 5:
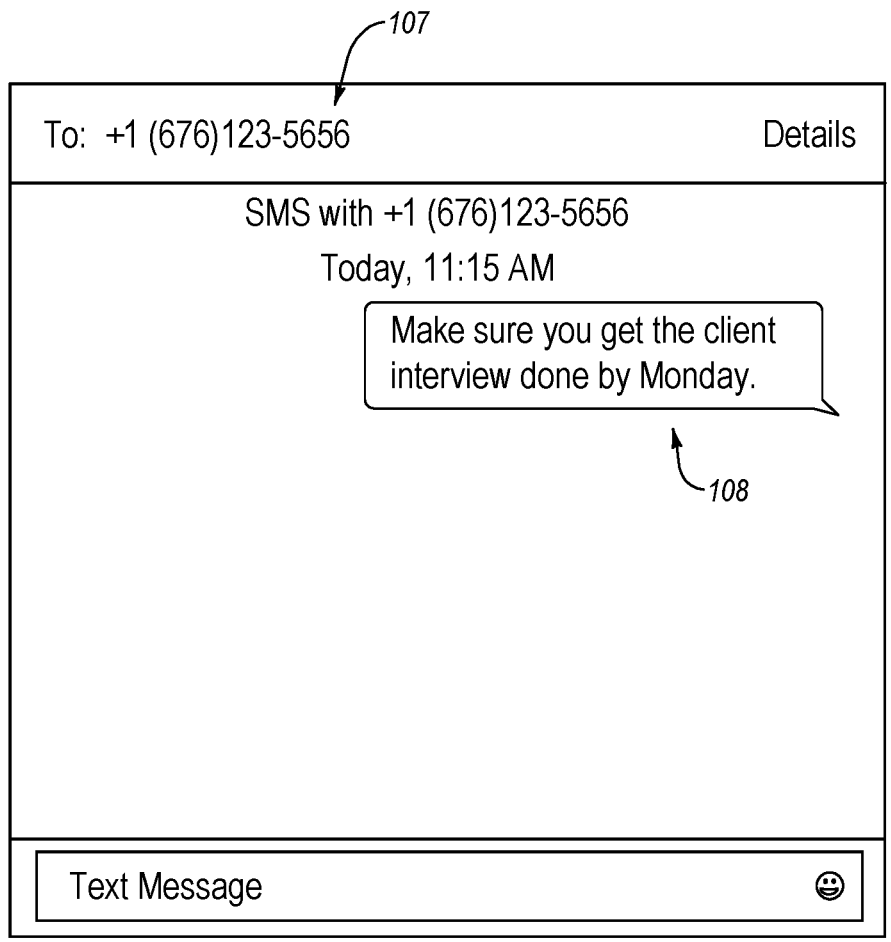
FIG. 5 illustrates an SMS/MMS application associated with a project's activity feed and integrating SMS/MMS messaging.

With the context of FIGS. 1-4, creation of an SMS/MMS thread by sending an SMS/MMS message to the activity's associated phone number is now described. FIG. 5 depicts an SMS/MMS application associated with KC's phone number. In FIG. 5, KC has sent an SMS message 108 ("Make sure you get the client interview done by Monday") to the phone number 107 (676-123-5656) that was associated with the JS project.

Figure 6:
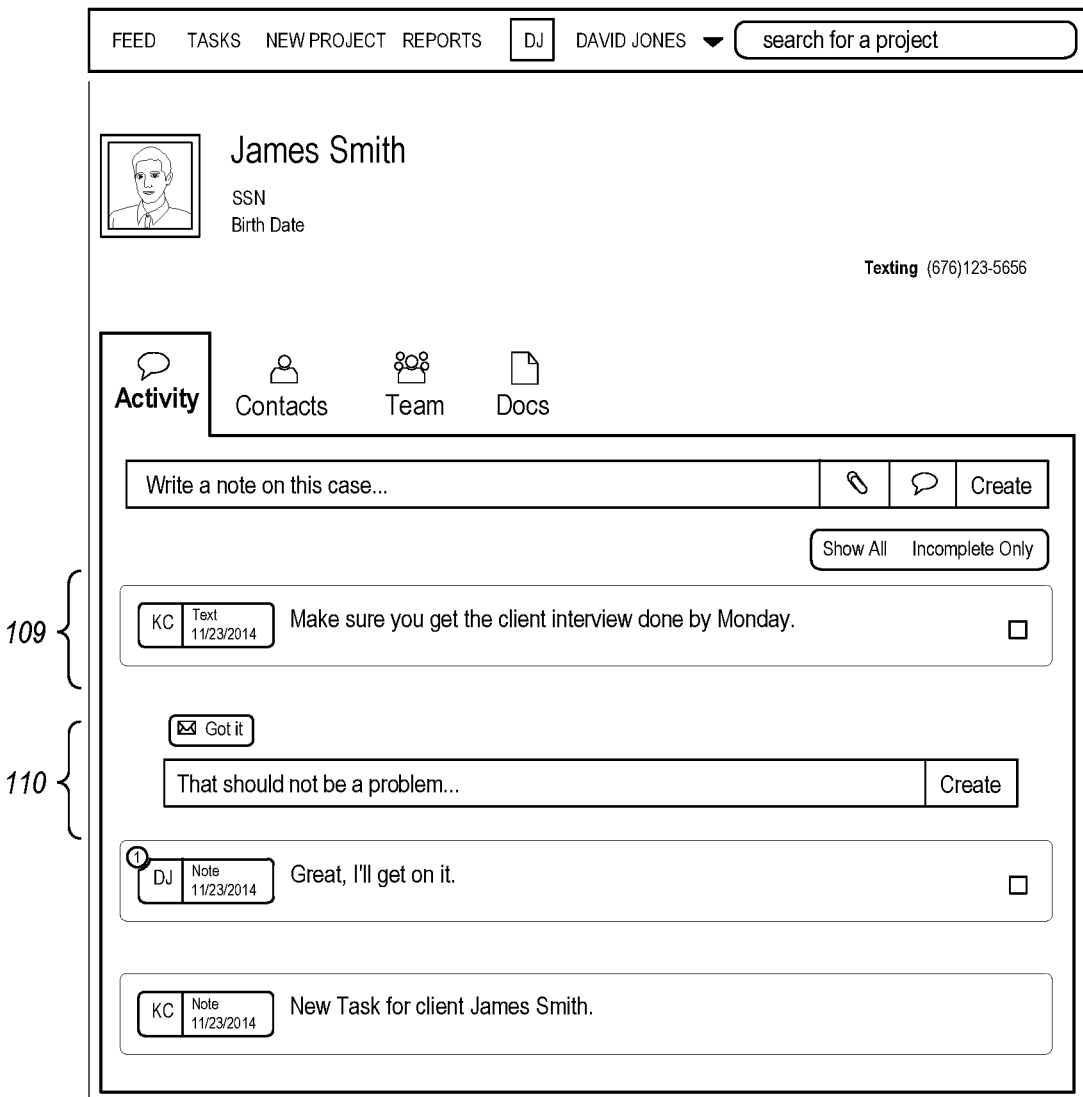
FIG. 6 illustrates a user interface of a computer application which has received and added to an activity feed a message sent from the SMS/MMS application of FIG. 5.

When the JS project's phone number 107 receives (e.g., through action of the SMS/MMS control 922b) the SMS/MMS message 108 that was sent by KC's phone number, the collaboration platform adds the message to the JS project's activity feed (e.g., through action of the project coordinator 922a). For example, FIG. 6 illustrates a user interface, which presents the JS project to the user DJ. In FIG. 6, the user interface is shown displaying KC's SMS message ("Make sure you get the client interview done by Monday.") from FIG. 5, which has been added to the activity feed by the project coordinator 922a as a new post 109. The project coordinator 922a can integrate this SMS/MMS-initiated post into the same feed as posts of other types (e.g., integrated with the internal "Note" type posts of the collaboration platform, that were discussed previously). As depicted, the project coordinator 922a can label, and the user interface can indicate, that the post 109 is of a "Text" type, since it originated from an SMS/MMS message. The project coordinator 922a can also label, and the user interface can indicate, the user that originated the post. For example, the post 109 is labeled with "KC," indicating and that it was posted/sent by KC. The project coordinator 922a can identify that the post originated from KC by identifying that the phone number that sent the SMS message to the project's phone number is the phone number that is associated KC's contact information stored and/or obtained by the collaboration platform. If the collaboration platform cannot identify the user that originated the post, the user interface may display an unknown user symbol (e.g., a silhouetted head), the phone number that the post came from, and/or any other appropriate designation(s).

Figure 7:
FIG. 7 illustrates a user interface of a computer application showing that a reply made to the activity feed of FIG. 6, using the interface of FIG. 6, shown in a separate user interface.

FIG. 6 also shows that the post 109 can become the basis for a new thread (e.g., a sub-thread within the larger project associated thread). For example, in FIG. 6 the user interface enables DJ to reply to the post 109, though a reply box 110. In FIG. 6, the user interface enables DJ to reply to KC's message (i.e., with the reply, "That should not be a problem."). FIG. 7, which returns to the user interface showing the James Smith project as presented to KC, illustrates that DJ's reply 111 is added to the thread by the project coordinator 922a.

Figure 8:
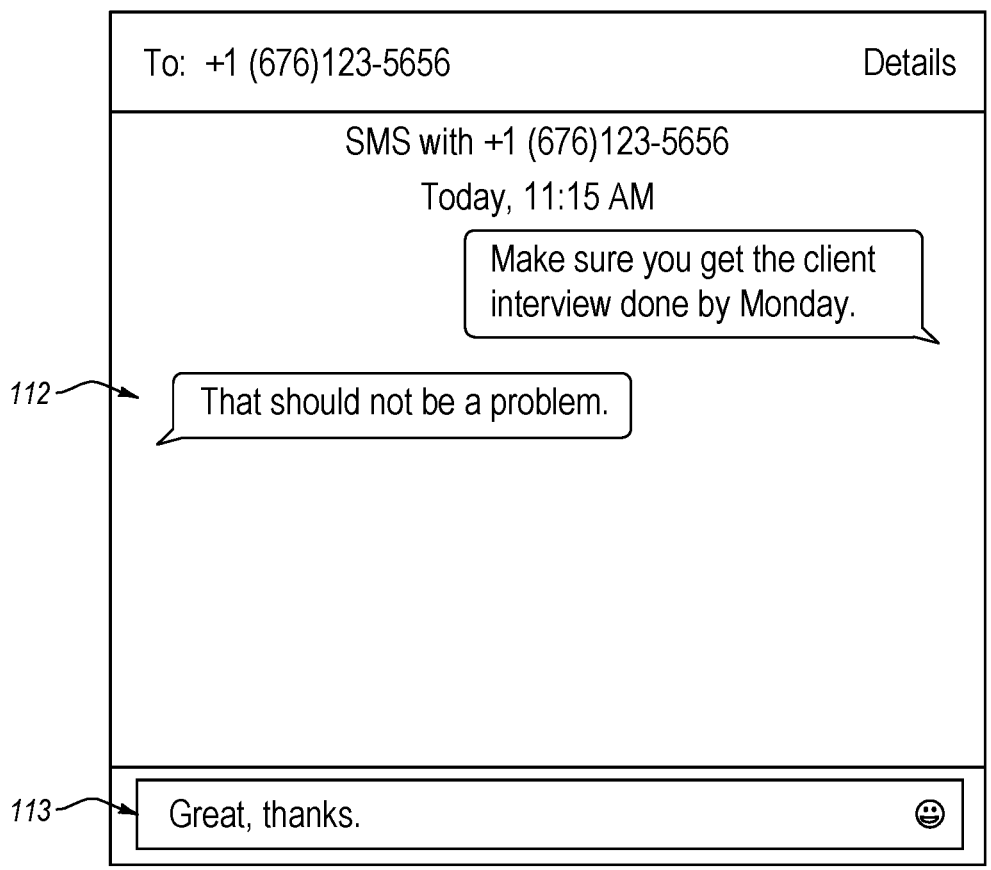
FIG. 8 illustrates the SMS/MMS application of FIG. 5 showing that a reply entered to the activity feed of FIG. 6 is displayed at the SMS/MMS application.
Figure 9:
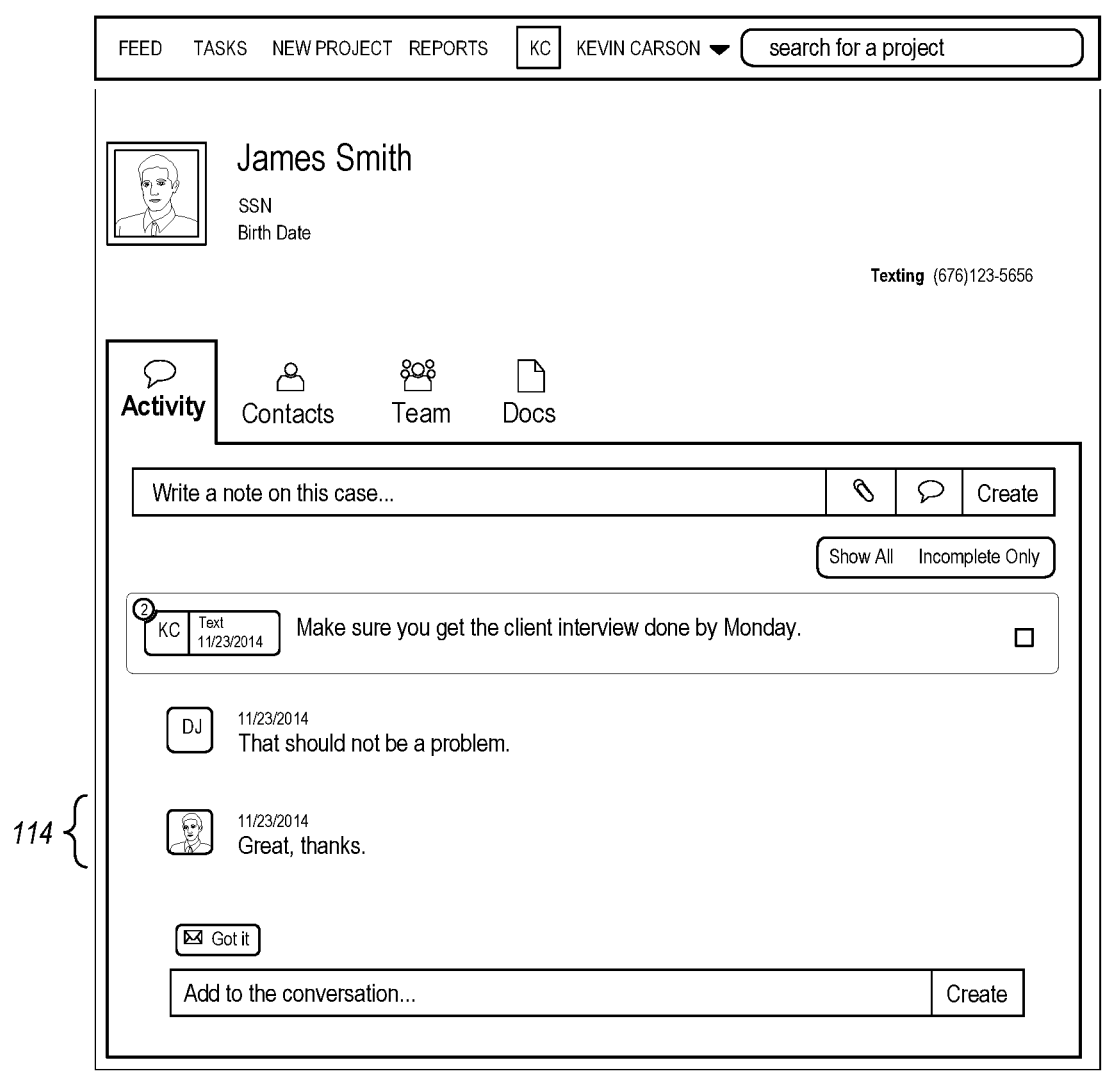

In addition, any replies made in the activity feed to a "Text" type post can be sent to one or more phone numbers from the activity feed's phone number using the SMS/MMS control 922b. For example, FIG. 8, which returns to a view of the SMS/MMS application associated with KC's phone number, illustrates that DJ's reply is also sent (through action of the SMS/MMS control 922b) from the project's phone number to KC's phone number (i.e., SMS message 112, "That should not be a problem"). FIG. 8 also illustrates that KC can further compose a reply 113 ("Great, thanks."), and FIG. 9 illustrates that KC's reply is received by the SMS/MMS control 922b and added to the thread (as post 114) by the project controller.

Figure 10:
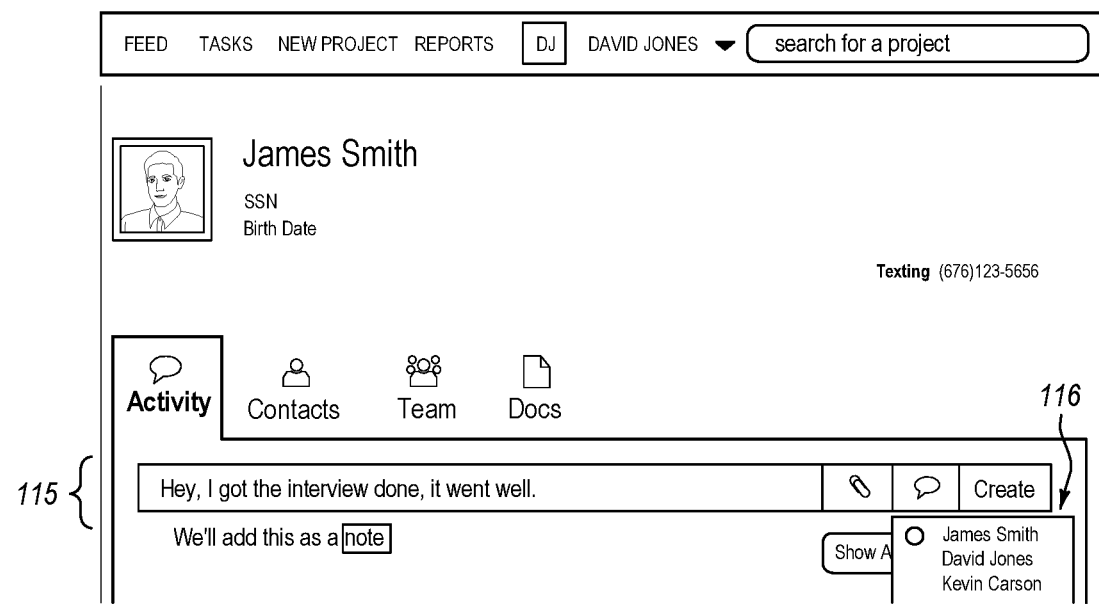
FIG. 10 illustrates a user interface of a computer application including a compose box for composing a new SMS/MMS message for delivery to one or more phone numbers.

In addition to enabling users to create an SMS/MMS thread on a project's activity feed by sending an SMS/MMS message to the project's phone number, the collaboration platform also enables a user to create an SMS/MMS thread directly from within the activity feed. For example, FIG. 10 illustrates the JS project as displayed by a user interface presented to DJ. In FIG. 10, a user interface compose box 115 enables DJ to compose a new message ("Hey, I got the interview done. It went well."). The user interface can present a selectable object allowing DJ to select "Create," enabling the message to be posted as a "Note" thread by action of the project coordinator 922a. The user interface can also present a selectable object allowing DJ to select a messaging option (see 106, FIG. 4), which enables the project coordinator 922a to present a list 116 of contacts who have phone numbers that are available for SMS/MMS messaging. Upon receiving a selection of one or more of these contacts at the user interface (e.g., FIG. 10 depicts that DJ has selected KC), and upon receiving a message composed at the user interface, the message is both (i) sent by the SMS/MMS control 922b from the project's phone number to the selected user(s), and (ii) added as a "Text" type post/thread to the activity feed by the project coordinator 922a.

Figure 11:
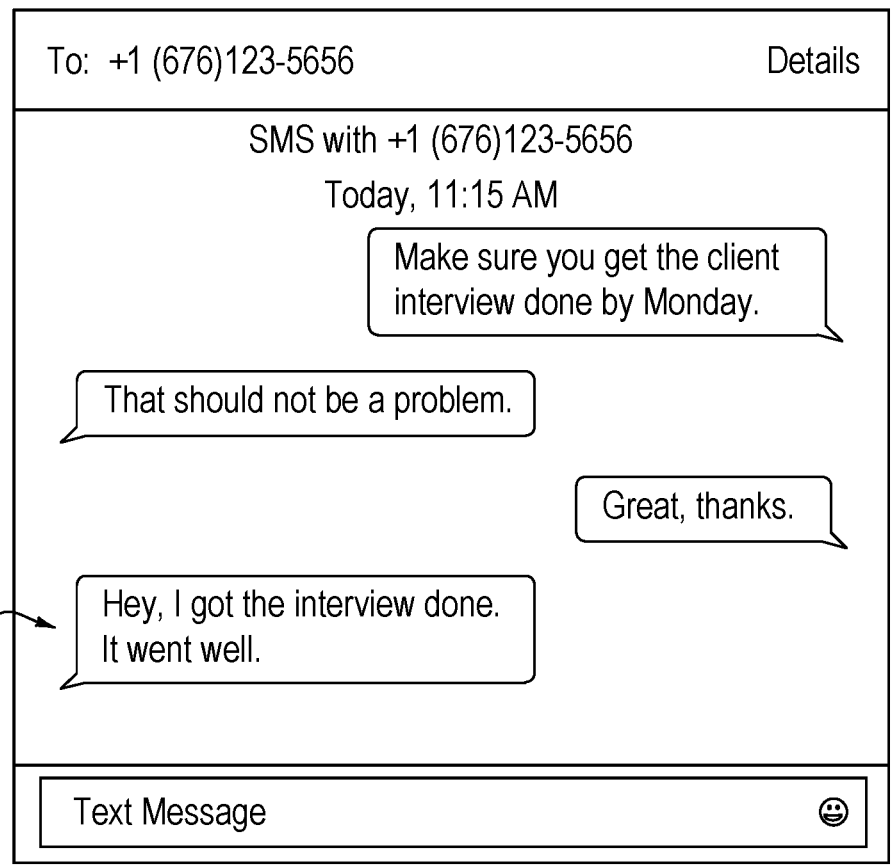
FIG. 11 illustrates an SMS/MMS application showing the content of a message created with the user interface of FIG. 10.

For example, FIG. 11, which returns to the SMS/MMS application associated with KC's phone number, now includes SMS message 117 with the content of DJ's new message. In addition, FIG. 12, which returns to the user interface displaying KC's view of the JS project, now includes a "Text" type post 118 displaying the content of DJ's new message. The project coordinator 922a also enables this post 118 to be replied to from within the activity feed, also enabling the SMS/MMS control 922b to initiate SMS/MMS messages to appropriate phone numbers.

Thus, the foregoing embodiments associate a phone number with a particular project within a collaboration platform, and use the phone number as a central gathering point for SMS/MMS messaging for the project. These and other embodiments described herein can beneficially increase the efficiency of electronic communication coordination in a collaborative environment. For example, the integration of SMS/MMS messaging within a collaboration platform enables communications to be directed to relatively simple client devices (e.g., mobile devices such as mobile phones, tablets, watches, etc.) in addition to or alternative to client devices operating a full version of the collaboration platform (e.g., a desktop computer, laptop computer, or other computing device displaying a project-related activity feed as exemplified above). This can efficiently broaden the reach of the project-related communications centralized within the collaboration platform. In addition, one or more embodiments can advantageously reduce the amount of data traffic passed through one or more networks linking the collaboration platform to clients, as it allows communications to be passed as relatively less data-intensive SMS/MMS messages in at least some instances. Further, one or more embodiments provide centralized data storage, enabling a reduction in the amount of data that must be stored. For example, a communication platform can store and coordinate all project-related communications (e.g., by displaying all communications at an activity feed), rather than requiring each separate client device to independently store one or more duplicative portions of project-related communication data.

As part of making a project's associated phone number a central gathering point for SMS/MMS messaging for the project, replies to "Text" type posts, received at a user interface, may be sent, by the SMS/MMS control 922b, to any appropriate phone number(s) as an SMS/MMS message. The appropriate phone number(s) may be selected by the project coordinator 922a based on a variety of criteria. For example, appropriate phone number(s) may be any combination of (i) the phone number that originally sent the SMS/MMS message that was added to the post that is being replied to, (ii) any phone number(s) associated with users who are part of a thread (e.g., users who have posted/replied to the thread, who have subscribed to the thread, etc.), (iii) any phone number(s) of users who have otherwise been associated with the project by the project coordinator 922a, (iv) any phone number(s) of users who have opted to participate in messaging with the project's phone number, (v) any phone number(s) of users who are associated with the project and that are of a particular user type (e.g., permission level), etc.

In some embodiments, an SMS/MMS message that is being sent by the SMS/MMS control 922b from a project's phone number may include an identifier of the user who initiated the message. This may be particularly useful if multiple users are part of an SMS/MMS conversation. For example, the SMS/MMS control 922b may prepend or append an SMS/MMS message with a user's name, initials, phone number, etc. For example, the SMS message 117 of FIG. 11 may be prepended with an identifier for David Jones, such as '[DJ] Hey, I got the interview done. It went well.', '@DavidJones Hey, I got the interview done. It went well.', '(David Jones) Hey, I got the interview done. It went well.', etc.

In some embodiments, the collaboration platform enables any person with knowledge of the project's phone number to send an SMS/MMS message to the project's phone number. In other embodiments, in order to introduce security and/or SPAM control, the filter 922*d* and/or SMS/MMS control 922*b* may filter out SMS/MMS messages that are sent from unknown/unregistered phone numbers, such that messages received from these unknown/unregistered phone numbers are not automatically added to the activity feed. In some embodiments, if an SMS/MMS message from an unknown/unregistered phone number is received by a project's phone number, then the SMS/MMS control 922*b* enables a reply to be sent from the project's phone number (or any other appropriate phone number) with instructions for registering with the collaboration platform, for confirming identity, etc.

Although not depicted in FIGS. 1-12, any multimedia content (e.g., video, picture, sound, etc.) sent as part of an MMS message and received by the SMS/MMS control 922*b* may be added to the activity feed by the project coordinator 922*a*. For example, a "Text" type post that is based on an MMS message may include a picture, video, sound, etc. that was included in the MMS message, as well as any text-based content. Similarly, multimedia content of any postings made to the activity feed using a user interface of the collaboration platform can be sent to one or more phones by the SMS/MMS control 922*b* via MMS message(s).

Figure 13:
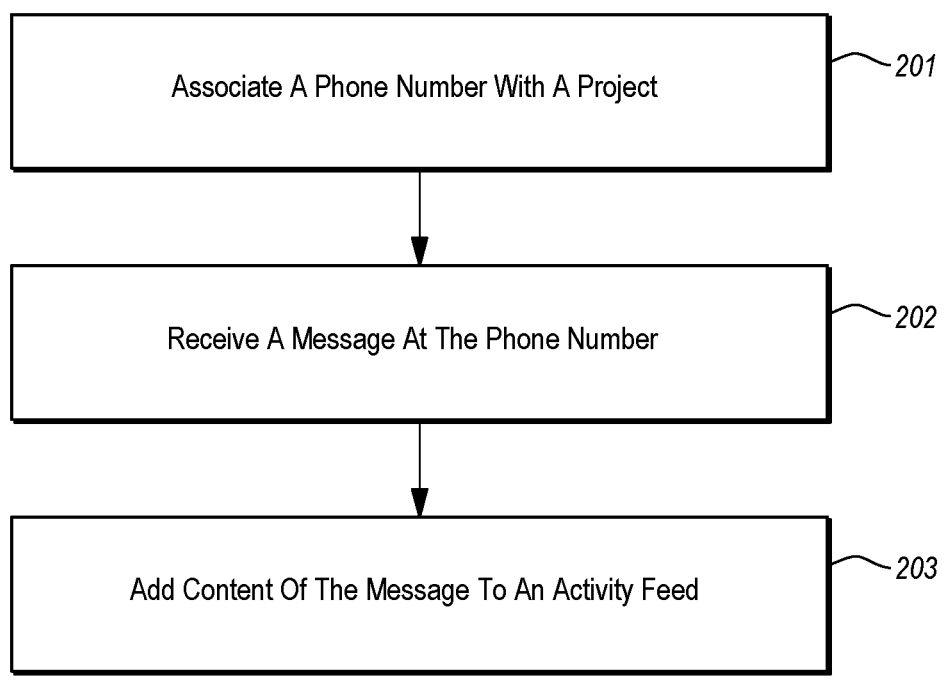
FIGS. 13-14 illustrate exemplary methods for integrating messaging with a project collaboration platform.
Figure 14:
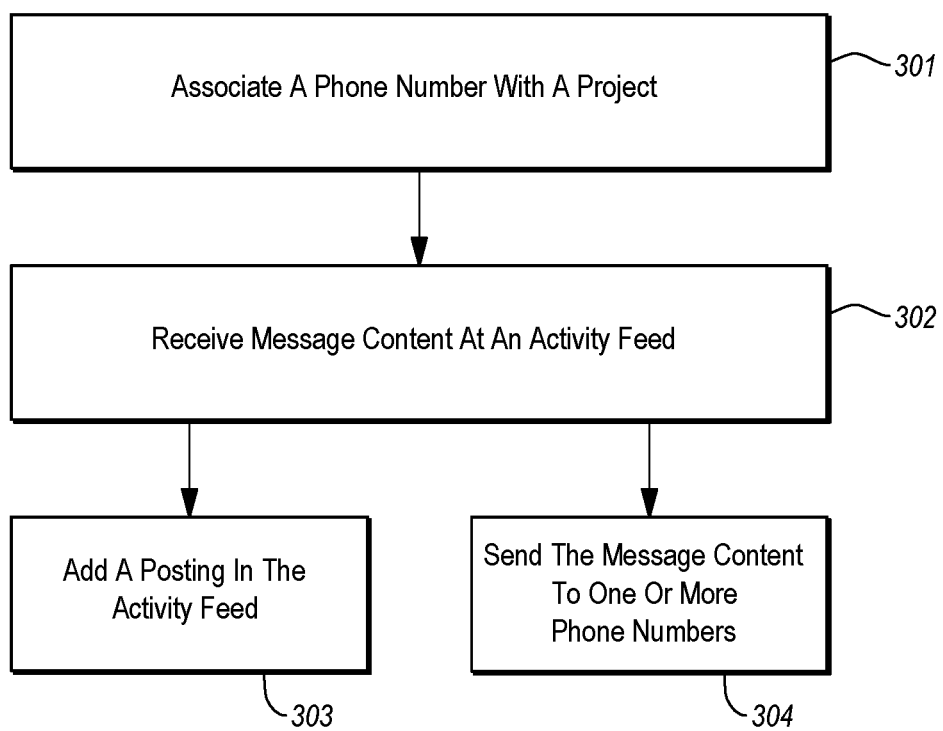

In view of the foregoing, FIGS. 13 and 14 depict example methods for integrating messaging with a collaboration platform. These methods are described in connection with the user interfaces of FIGS. 1-12.

Beginning with FIG. 13, FIG. 13 illustrates a method for integrating messaging with a collaboration platform, from the perspective of adding messages received by an SMS/MMS control 922*b* at a project's associated phone number to an activity feed of the project, using a project coordinator 922*a*.

FIG. 13 includes an act 201 of associating a phone number with a project. Act 201 can comprise associating a phone number with a particular project within a computer-implemented collaboration platform. For example, FIG. 2 depicts a "turn on texting" user interface element 104 that, when selected, enables texting for a project associated with JS. FIG. 3 depicts that enabling texting can include receiving the identity of a desired area code for the number. FIG. 4 depicts that, based on selection of the "turn on texting" user interface element 104, a project coordinator 922*a* associates a phone number 105 (676-123-5656) with the JS project.

FIG. 13 also includes an act 202 of receiving a message at the phone number. For example, FIG. 5 depicts that an SMS/MMS control 922*b* of a collaboration platform receives an SMS message 108 sent from user KC to the phone number 107 that is associated with the JS project. This SMS message 108 is then received by the phone number 105 that is associated with the JS project.

FIG. 13 also includes an act 203 of adding content of the message to an activity feed. Act 203 can comprise, based on receiving the message at the phone number, a project coordinator 922*a* adding content of the message to an activity feed, displayed at a user interface, of the particular project. For example, FIG. 6 depicts a user interface displaying that the content of the SMS message 108 is added as a new posting in the activity feed of the JS project.

It will be appreciated that, while this new posting is displayed as a top-level posting in a thread, the posting could also be a lower-level posting in the thread, such as if the SMS message 108 was received in reply to an existing posting. Also, as depicted, the posting that is added based on the SMS message 108 may be added to an activity feed that includes other types of postings, such as "Note" type postings of an internal messaging system.

Turning to FIG. 14, FIG. 14 illustrates a method for integrating messaging with a computer-implemented collaboration platform, from the perspective of sending messages, entered at an activity feed of a user interface, to one or more phone numbers.

FIG. 14 includes an act 301 of associating a phone number with a project. Act 301 can comprise a project coordinator 922*a* associating a phone number with a particular project within a computer-implemented collaboration platform. For example, FIG. 2 depicts a "turn on texting" user interface element 104 that, when selected, enables texting for a project associated with JS. FIG. 3 depicts that turning on texting can include receiving the identity of a desired area code for the number. FIG. 4 depicts that, based on selection of the "turn on texting" option, a phone number 105 (676-123-5656) is associated with the JS project.

FIG. 14 also includes an act 302 of receiving message content at an activity feed. Act 302 can comprise the project coordinator 922*a* receiving message content at an activity feed of the particular project. For example, FIG. 6 illustrates that message content can be received and posted as a reply 110 in a thread, and FIG. 10 illustrates that message content can be received and posted as a new thread posting 115.

FIG. 14 also includes an act 303 of adding a posting in the activity feed, and an act 304 of sending the message content to one or more phone numbers. Acts 303 and 304 can comprise, based on the project coordinator 922*a* receiving message content at the activity feed of the particular project, (i) the project coordinator 922*a* adding a posting in the activity feed, and (ii) the SMS/MMS control 922*b* sending the message content to one or more phone numbers. For example, FIG. 7 illustrates that the reply 110 of FIG. 6 can result in a posting 111 in the activity feed with the message content, and FIG. 8 illustrates that the project's phone number can be used to send out an SMS/MMS message 112 with the message content. In addition, FIG. 11 illustrates that new thread posting 115 of FIG. 10 can result in the project's phone number being used to send out an SMS/MMS message 117 with the message content, and FIG. 12 illustrates that a posting 118 can be added to the activity feed with the message content.

In some embodiments, the collaboration platform can enable control over whether a particular post/reply will be sent over SMS. For example, even though a user is posting a reply to a "Text" type thread, the user interface may enable a user to specify that the reply should not be sent out over the associated phone number to one or more users. In another example, even though a user is posting a reply to a "Note" type thread, the user interface may enable the user to specify that the reply should be sent out as an SMS/MMS message over the associated phone number to one or more users.

The embodiments herein are not limited to centralizing SMS/MMS communications. For example, embodiments may include associating a particular project with other appropriate forms of communication (e.g., e-mail address, VoIP account, Internet messaging account, etc.). Embodiments may include centralizing voice mail recordings and/or transcriptions of voice mail recordings (e.g., auto-generated) sent to an associated phone number. Thus, embodiments can integrate messages received using these other form(s) of communication into the particular project's activity feed, and can send activity feed posts to these other form(s) of communication, similar to the SMS/MMS embodiments described herein. Thus, a single activity feed can include postings from a variety of sources, such as internal messaging, SMS/MMS, e-mail, VoIP, Internet messaging, etc.

In some embodiments, a project coordinator 922a may associate a telephone number (that is capable of sending and receiving SMS/MMS messages) with a plurality of projects within a computer-implemented collaboration platform. Embodiments may also include one or more mechanism for filtering and sorting SMS/MMS communications sent or received by the telephone number according to the plurality of projects associated with the telephone number.

For example, in some embodiments, a project coordinator 922a may associate a telephone number with a set of projects grouped together by type of project, project deadlines, project start dates, project priority rankings, etc. In some embodiments, a telephone number may be associated with a set of projects belonging to and/or being managed by a particular entity (e.g., firm, business, group, organization, and/or individual). For example, an entity may have a single promoted telephone number or a collection of promoted telephone numbers numbering less than the number of projects the entity desires to use within the collaboration platform. In such embodiments, a given telephone number may be associated with a plurality of different projects.

At least some of such embodiments may include a filter 922d for organizing SMS/MMS communications received by and/or sent from the associated telephone number. For example, FIGS. 15-19 illustrate examples of a computer-implemented collaboration platform configured to filter and sort SMS/MMS communications relating to a plurality of projects, each communication being received by and/or sent from a single telephone number. One of ordinary skill in the art will appreciate, in view of the disclosure herein, that the embodiments of FIGS. 15-19 represent only example implementations of a computer-implemented collaboration platform configured to organize and sort SMS/MMS communications relating to a plurality of projects wherein each project is associated with the same telephone number. As such, one of ordinary skill in the art will appreciate that associating a telephone number with a plurality of projects in a collaboration platform, and filtering/sorting SMS/MMS messages sent or received by the telephone number among the plurality of projects, may be implemented in a variety of forms.

Figure 15:
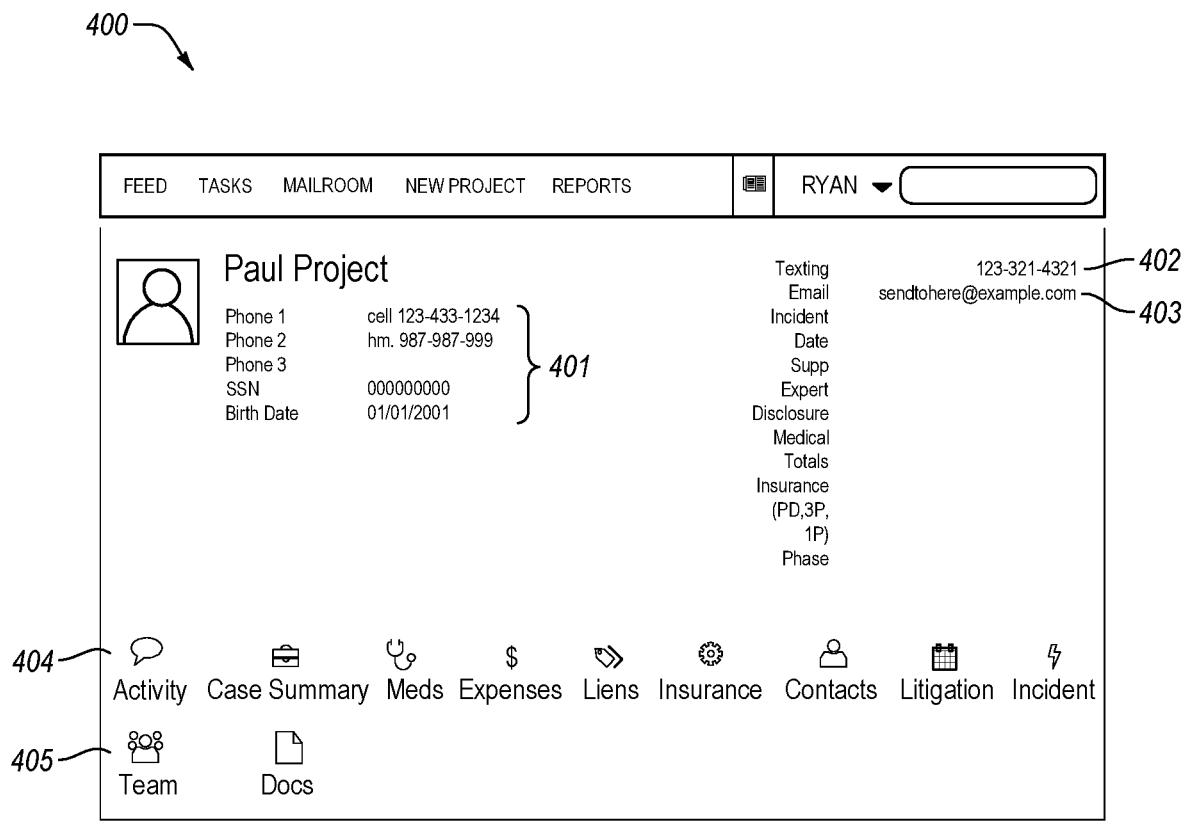
FIG. 15 illustrates an example user interface of a computer application configured for filtering message content received at a phone number associated with a plurality of projects.

FIG. 15 illustrates an example user interface 400 of a computer-implemented collaboration platform. In the user interface of FIG. 15, a particular project for a client (Paul Project, hereinafter PP) is being displayed to a user (Ryan, hereinafter R). As shown, the user interface may provide project or client identifiers 401, such as telephone number(s), birth date, social security number, address(es), etc. In addition, the user interface may display a telephone number 402 associated with the project that is configured to receive and/or send SMS/MMS communications (123-321-4321). The user interface may also display additional information related to the project, such as an email address 403 that has been associated with the project, and/or other types of information related to the project (which may vary according to the type of project, phase of project, etc.). In this particular example, the telephone number that is associated with the project is also associated with one or more additional projects (e.g., other projects being managed by the same entity/organization).

As shown, the user interface 400 may also display one or more user interface elements enabling navigation to other user interface displays or enabling the display of additional information (e.g. activity, summary, expenses, contents, documents, etc.). As shown, the user interface 400 may include an "Activity" user interface element 404 which, upon selection, provides for the display of a project activity feed such as the project activity feeds described above (see, e.g., FIGS. 1, 2, 4, 6, 7, 9, and 10). The user interface 400 may also include a "Team" user interface element 405 which, upon selection, provides for the display of project followers and/or other team members that have been associated with the PP project.

Figure 16:
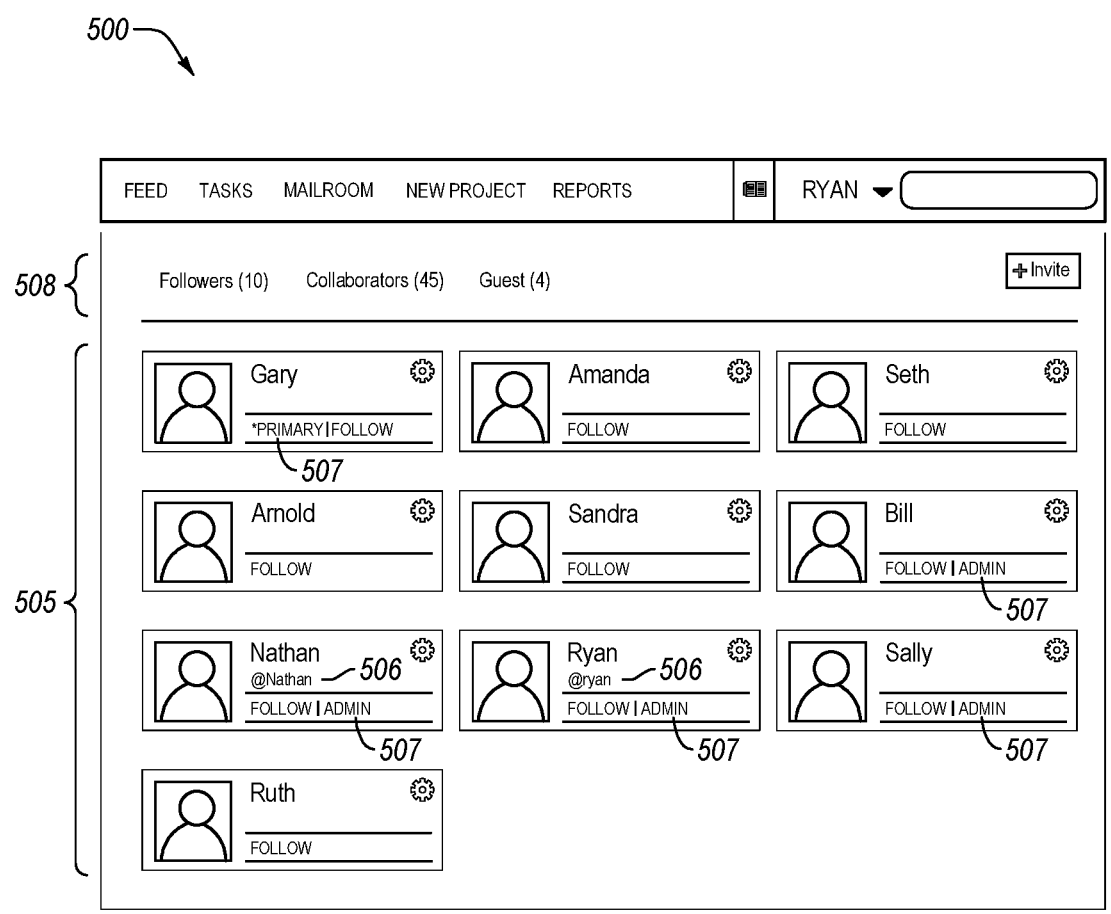
FIG. 16 illustrates an example user interface for displaying and/or adding project followers to a project.

FIG. 16 illustrates a user interface 500 displaying a number of "Followers" of the PP project. In some embodiments, the user interface 500 is provided by selecting the "Team" user interface element 405 from the user interface 400 depicted in FIG. 15. As shown in FIG. 16, the user interface 500 can display one or more project followers 505. In some embodiments, one or more project followers can include a status identifier 507 that displays a project follower according to rank, title, or other identifier, such as Gary labeled as "Primary" and Nathan, Ryan, Bill, and Sally labeled as "Admin." In addition, one or more project followers may include a handle 506 (e.g., username, or other identifier of the associated user), such as Nathan having the handle @nathan and Ryan having the handle Aryan.

As shown, a project may have a number of "Followers," and may also have a number of "Collaborators," and/or "Guests" (viewable by selecting the corresponding item of group menu 508). In some embodiments, Followers may include those users who are notified when a communication related to the product has been sent and/or received, whereas Collaborators may include those users who have access to the project (e.g., access to an activity feed associated with the project), but are not notified, or are notified less frequently, upon the receipt and/or sending of communications related to the project. Guests may include those users who have been granted temporary access to the project and/or may include those users who are not members of the entity/organization managing the project but are given some amount of access to the project (e.g., clients, relevant third parties, etc.).

In some embodiments, Followers (and/or Collaborators and/or Guests) can receive a message received by the telephone number associated with the project upon the message being related to the project by the filter 922d of the collaboration platform. For example, after a message that has been received by the telephone number is related to the project (e.g., through action of the filter 922d identifying the particular project from among a plurality of projects also associated with the telephone number), Followers of the project can receive the message at the activity feed associated with the project (through action of the project coordinator 922a as described above) and/or as the message is forwarded to a telephone number associated with the Follower (e.g., through the SMS/MMS control 922b sending the message to a Follower's mobile device telephone number).

Communications received by a telephone number that has been associated with a plurality of projects may be sorted and directed, by the filter 922d, toward the appropriate project(s) of the plurality of projects according to one or more identifiers within the communication. For example, a communication sent from a telephone number that has been associated with a client and/or project (e.g., that has been stored by the collaboration platform) can be automatically routed by the filter 922*d* to the one or more projects related to that client and/or project. Referring back to FIG. 15 as an example, an SMS/MMS message sent to telephone number 402 (123-321-4321, a number that has been associated with a plurality of projects) from a telephone number associated with an identifier 401 (e.g., the number 987-987-9999) can be automatically routed by the filter 922*d* to the PP project because the number 987-987-9999 has been associated with PP.

FIG. 17 illustrates a user interface 600 enabling identifiers 601 such as telephone numbers, email addresses, or other identifiers to be associated with a given client/project/person. As shown, address, telephone number, email, and other identifying information may be entered. After entry of such information, a communication sent via SMS/MMS message from a telephone number entered as an identifier 601 (e.g., 123-433-1234) can be received by the telephone number associated with the plurality of projects and can be appropriately routed by the filter 922*d* to the PP project by matching the telephone number from which the message was sent to the telephone number entered as an identifier 601 using the user interface 600 illustrated in FIG. 17.

Figure 18:
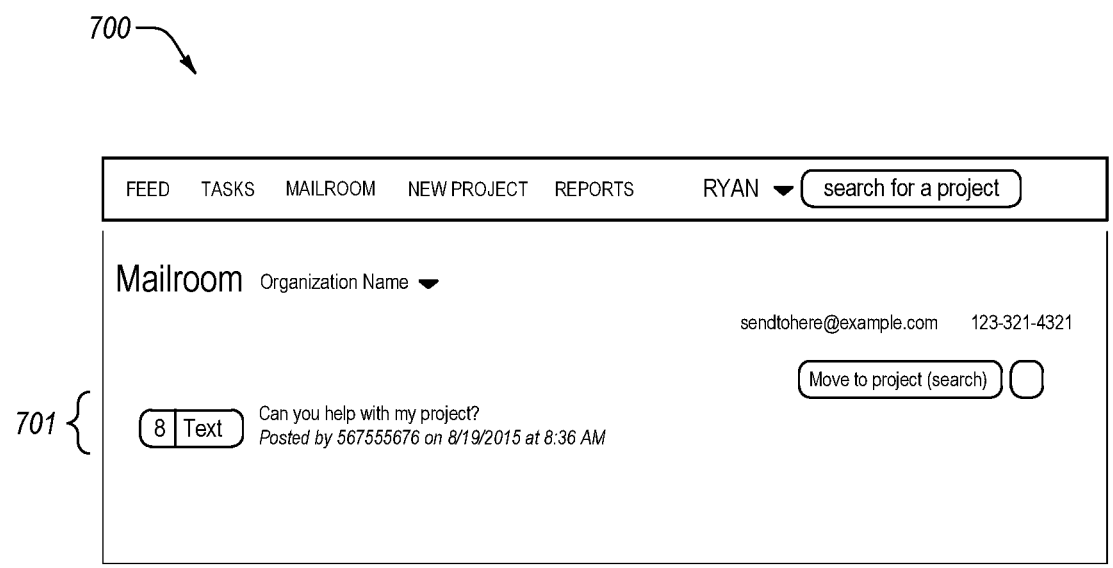
FIG. 18 illustrates a mailroom user interface for listing received but unsorted communications.

FIG. 18 illustrates a user interface 700 displaying a "Mailroom" for listing unidentified/unsorted communications. For example, a communication that cannot be automatically routed by the filter 922*d* to one or more appropriate projects (e.g., because the number from which the message was sent does not match any previously saved client and/or project associated telephone numbers or other identifiers), can be placed in the Mailroom by the filter 922*d* where it may be manually sorted (e.g., into an existing project or as part of a new project). As shown, the message 701 "Can you help with my project?" which has been sent from an unidentified telephone number (567-555-6767) has been placed in the Mailroom.

Figure 19:
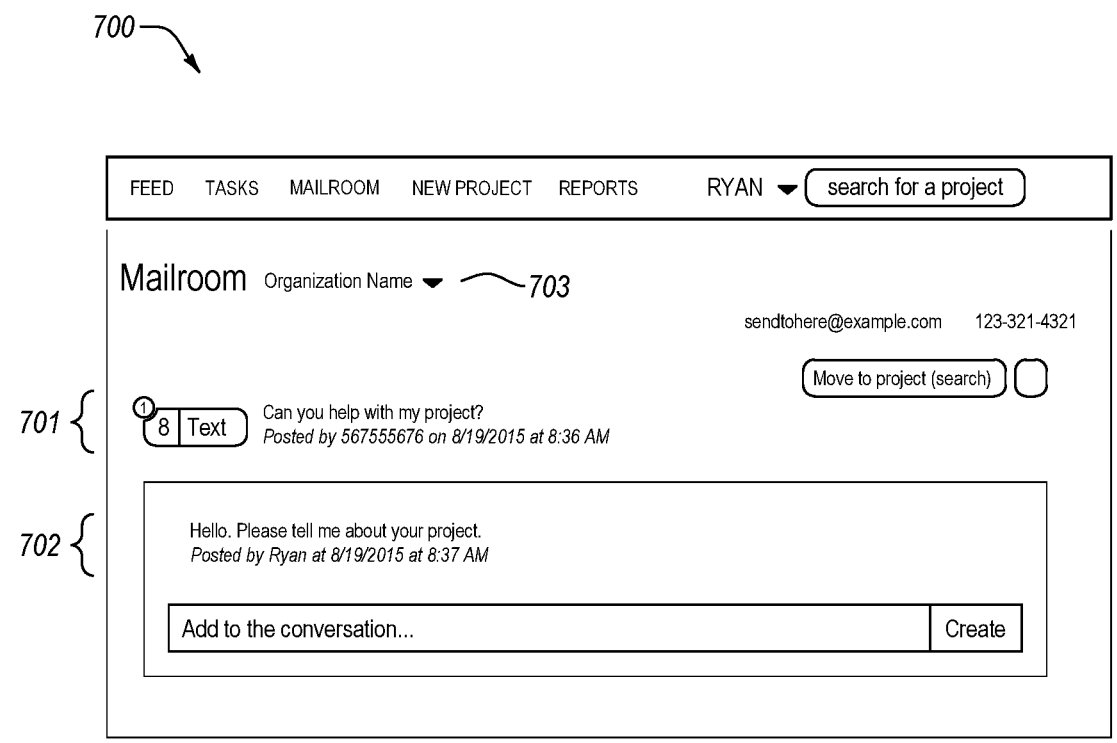
FIG. 19 illustrates the mailroom user interface of FIG. 18, showing that the user interface may be used to initiate SMS/MMS communications.

FIG. 19 illustrates that the Mailroom user interface 700 may also be used to initiate SMS/MMS communications that may be sent from the telephone number associated with a plurality of projects (123-321-4321). As shown, user R has posted a response 702 to the Mailroom message 701 by replying "Hello. Please tell me about your project." This message may then be sent by the SMS/MMS control 922*b* as an SMS message to the 567-555-6767 telephone number, from which message 701 was received, as an SMS message sent from the 123-321-4321 number (e.g., the organization's central number and/or number associated with a plurality of projects). In addition, the user interface 700 can also display an "Organization Name" menu 703 (e.g., dropdown list) enabling a user to select the Mailroom associated with the selected organization or entity from one or more additional mailrooms that may be associated with a user's account.

Figure 20:
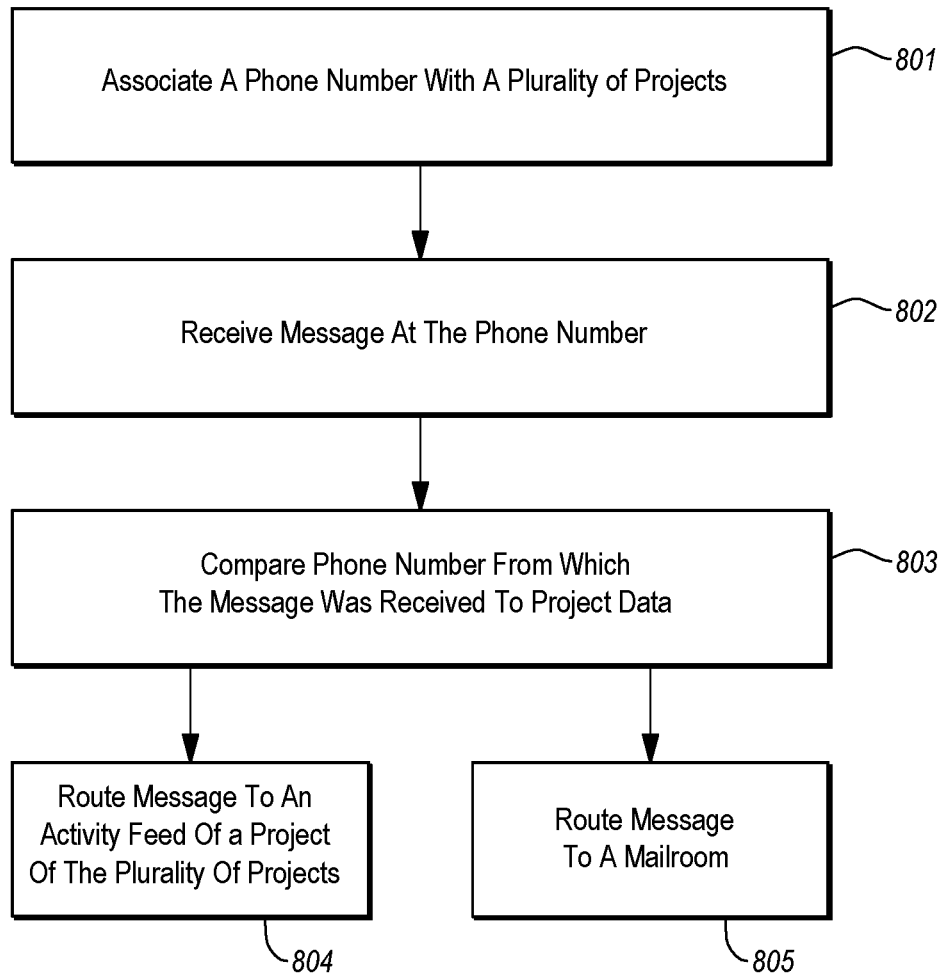
FIG. 20 illustrates an exemplary method for integrating messaging with a computer application, where a phone number is associated with a plurality of projects.

In view of the foregoing, FIG. 20 depicts an example method for integrating messaging with a collaboration platform, where a phone number of the collaboration platform is associated with a plurality of projects. This method may be used in connection with the user interfaces of FIGS. 15-19.

FIG. 20 includes an act 801 of associating a phone number with a plurality of projects. Act 801 can include a project coordinator 922*a* associating a phone number with a plurality of projects within a collaboration platform. FIG. 20 also includes an act 802 of receiving a message at the phone number (e.g., by the SMS/MMS control 922*b* receiving the message), and an act 803 of comparing the number from which the message was received to project data (e.g., identifiers) of the plurality of projects (using the filter 922*d*). For example, the number from which the message was received can be compared to telephone numbers previously associated with a client and/or project, such as an identifier 601 entered through the user interface 600 depicted in FIG. 17.

Upon matching the number from which the message was received to an identifier or other identifying project data, the method of FIG. 20 can proceed to act 804 of routing the message to one or more projects of the plurality of projects. For example, the message may be routed by the filter 922*d* to an activity feed of a matched project, such as an activity feed accessible using the interface 400 depicted in FIG. 15. Additionally, or alternatively, the message may be sent to one or more project followers (e.g., as an SMS/MMS message sent by the SMS/MMS control 922*b*) that are displayed and/or added to a project using interface 500 depicted in FIG. 16.

Alternatively, upon failing to match the number from which the message was received to project data, the method of FIG. 20 can proceed to act 805 of routing the message to a mailroom. For example, the message may be routed to a mailroom where it may be displayed, sorted, organized, and/or responded to using the interface 700 depicted in FIGS. 18 and 19.

Elements of embodiments described herein may be combined with elements of other embodiments described herein. For example, any of the elements of the embodiments described in relation to FIGS. 1-14 may be combined with, replaced by, or may replace any of the elements of the embodiments described in relation to FIGS. 15-20 and/or FIG. 21, and vice versa.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

Embodiments of the present invention may comprise or utilize a special-purpose or general-purpose computer system that includes computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A method, implemented at a computer system that includes one or more processors, for integrating at least one of SMS or MMS messaging into a computer-hosted collaboration platform, the method comprising:

associating a first phone number with a project within the computer-hosted collaboration platform, the collaboration platform enabling one or more users to post to an activity feed of the project, the association enabling the first phone number to be usable to post to the activity feed of the project using at least one of SMS or MMS messaging;

receiving, from a second phone number associated with a mobile telephone device, an SMS or MMS message that is directed to the first phone number; and based on receiving the SMS or MMS message that is directed to the first phone number, adding a post to the activity feed of the project, the post including message content from the received SMS or MMS message.

2. The method as recited in claim 1, wherein receiving the SMS or MMS message comprises receiving an MMS message, and wherein the message content comprises multimedia content from the MMS message.

3. The method as recited in claim 1, wherein receiving the SMS or MMS message comprises receiving an SMS message, and wherein the message content comprises textual content from the SMS message.

4. The method as recited in claim 1, further comprising, based on adding the post to the activity feed, sending the message content to one or more phone numbers associated with one or more mobile devices using SMS or MMS messaging.

5. The method as recited in claim 4, wherein the message content is sent by the first phone number to the one or more phone numbers.

6. The method as recited in claim 4, wherein the one or more phone numbers are associated with one or more project followers.

7. The method as recited in claim 1, further comprising verifying that the second phone number is authorized to post to the project prior to adding the post to the activity feed of the project.

8. The method as recited in claim 1, further comprising, based on user input received by the computer-hosted collaboration platform,
    creating a new post that includes content received as part of the user input, and
    sending the content received as part of the user input to one or more phone numbers associated with one or more mobile devices using SMS or MMS messaging.

9. The method as recited in claim 8, wherein sending the content received as part of the user input to the one or more phone numbers comprises inserting an identifier of a user that provided the user input.

10. The method as recited in claim 1, wherein associating the first phone number with the project includes receiving user input of an area code for the first phone number.

11. A method, implemented at a computer system that includes one or more processors, for integrating at least one of SMS or MMS messaging into a computer-implemented collaboration platform, the method comprising:
    associating a first phone number with a plurality of projects within the computer-implemented collaboration platform, enabling the first phone number to be usable to post to one or more of the plurality of projects using at least one of SMS or MMS messaging;
    receiving, from a second phone number associated with a mobile telephone device, at least one of an SMS or MMS message that is directed to the first phone number;
    based on receiving the SMS or MMS message, comparing one or more identifiers within the received SMS or MMS message to project data associated with the plurality of projects; and
    based on comparing one or more identifiers within the received SMS or MMS message to the project data,
        routing the received SMS or MMS message to an activity feed of a project of the plurality of projects, or
        routing the received SMS or MMS message to a mailroom as a message currently unassociated with any project of the plurality of projects.

12. The method as recited in claim 11, wherein the one or more identifiers include the second phone number.

13. The method as recited in claim 11, wherein the received SMS or MMS message is routed to the activity feed of the project of the plurality of projects, and wherein the method also comprises adding a post to the activity feed of the project, the post including message content from the SMS or MMS message.

14. The method as recited in claim 13, further comprising sending the message content to one or more phone numbers associated with one or more mobile devices using SMS or MMS messaging.

15. The method as recited in claim 13, further comprising verifying that the second phone number is authorized to post to the project prior to adding the post to the activity feed of the project.

16. The method as recited in claim 13, wherein the received SMS or MMS message is routed to the activity feed of the project of the plurality of projects based on the second phone number being associated with a user associated with the project.

17. The method as recited in claim 11, wherein the received SMS or MMS message is routed to the mailroom as the message currently unassociated with any project of the plurality of projects.

18. The method as recited in claim 17, wherein the mailroom includes a mailroom feed that allows the message to be manually associated with one or more projects of the plurality of projects.

19. The method as recited in claim 17, wherein the mailroom includes a mailroom feed that allows the message to be responded to, and wherein any response is sent by the first phone number to the second phone number as an SMS or MMS message.

20. A method, implemented at a computer system that includes one or more processors, for integrating at least one of SMS or MMS messaging into a computer-implemented collaboration platform, the method comprising:
    associating a first phone number with a plurality of projects within a collaboration platform to form a project plurality phone number that is usable to post to at least one of the plurality of projects using at least one of SMS or MMS messaging;
    receiving an SMS or MMS message at the project plurality phone number, the SMS or MMS message being received from a second phone number associated with a mobile telephone device;
    based on receiving the SMS or MMS message, comparing the second phone number to project data associated with the plurality of projects; and
    based on comparing the second phone number to the project data,
        routing the SMS or MMS message to an activity feed of a project of the plurality of projects, or
        routing the SMS or MMS message to a mailroom as a message currently unassociated with a project of the plurality of projects.

* * * * *

UNITED STATES PATENT AND TRADEMARK OFFICE
CERTIFICATE OF CORRECTION

| | | |
|---|---|---|
| PATENT NO. | : 10,887,274 B2 | Page 1 of 1 |
| APPLICATION NO. | : 16/821461 | |
| DATED | : January 5, 2021 | |
| INVENTOR(S) | : Anderson et al. | |

It is certified that error appears in the above-identified patent and that said Letters Patent is hereby corrected as shown below:

In the Specification

<u>Column 5</u>
Line 7, change "similar" to –similarly–

<u>Column 7</u>
Line 13, change "associated KC's" to –associated with KC's–

<u>Column 12</u>
Line 27, change "Aryan" to –@ryan–

Signed and Sealed this
Sixteenth Day of March, 2021

Drew Hirshfeld
*Performing the Functions and Duties of the*
*Under Secretary of Commerce for Intellectual Property and*
*Director of the United States Patent and Trademark Office*